United States Patent
Holenstein et al.

(10) Patent No.: US 9,985,823 B1
(45) Date of Patent: May 29, 2018

(54) METHOD AND SYSTEM FOR MITIGATING CORRELATED FAILURE MODES

(71) Applicant: Gravic, Inc., Malvern, PA (US)

(72) Inventors: Bruce D. Holenstein, Media, PA (US); Wilbur H. Highleyman, Blairstown, NJ (US); Paul J. Holenstein, Downingtown, PA (US)

(73) Assignee: Gravic, Inc., Malvern, PA (US)

( * ) Notice: Subject to any disclaimer, the term of this patent is extended or adjusted under 35 U.S.C. 154(b) by 0 days. days.

(21) Appl. No.: 15/185,652

(22) Filed: Jun. 17, 2016

(51) Int. Cl.
G06F 15/173 (2006.01)
H04L 12/24 (2006.01)
H04L 29/08 (2006.01)

(52) U.S. Cl.
CPC ...... *H04L 41/0654* (2013.01); *H04L 41/0681* (2013.01); *H04L 41/147* (2013.01); *H04L 67/1095* (2013.01)

(58) Field of Classification Search
CPC ... H04L 67/10; H04L 41/082; H04L 43/0817; H04L 43/16; H04L 67/2852; H04L 67/34; G06F 17/30079; G06F 11/1456; G06F 11/2033
See application file for complete search history.

(56) References Cited

U.S. PATENT DOCUMENTS

| | | | |
|---|---|---|---|
| 7,113,938 B2 | 9/2006 | Highleyman et al. | |
| 7,236,910 B1* | 6/2007 | Garrett | G06Q 10/06 700/108 |
| 2005/0149570 A1* | 7/2005 | Sasaki | G06Q 10/06 |
| 2010/0191884 A1* | 7/2010 | Holenstein | G06F 11/2094 710/200 |
| 2015/0134396 A1* | 5/2015 | Mukherjee | G06Q 10/06315 705/7.25 |
| 2016/0034362 A1* | 2/2016 | Al-Wahabi | G06F 11/203 714/4.1 |

OTHER PUBLICATIONS

W. H. Highleyman, P. J. Holenstein, B. D. Holenstein, Breaking the Availability Barrier: Survivable Systems for Enterprise Computing; AuthorHouse, Chapter 1—The 9s Game, Copyright © 2004, 3-25, 26 pages.
W. H. Highleyman, P. J. Holenstein, B. D. Holenstein, Breaking the Availability Barrier: Survivable Systems for Enterprise Computing; AuthorHouse, Chapter 2—System Splitting, Copyright © 2004, 27-44, 20 pages.

* cited by examiner

*Primary Examiner* — Hitesh Patel
(74) *Attorney, Agent, or Firm* — Panitch Schwarze Belisario & Nadel LLP

(57) ABSTRACT

A system is provided for mitigating partially correlated failure modes to increase application availability. The system includes a plurality of nodes connected by a computer network, each node configured to run an instance of the same application, a failure analysis engine configured to maintain current availability statistics for the nodes of the system, calculate current mean time to failure (MTTF) for the system as a function of the current time from the availability statistics, and compare the current MTTF to a plurality of threshold values, each of the threshold values corresponding to one or more actions to be taken to increase application availability, and a failure prevention engine that performs the one or more actions to increase application availability.

29 Claims, 15 Drawing Sheets

Flow Chart for the Failure Analysis Engine

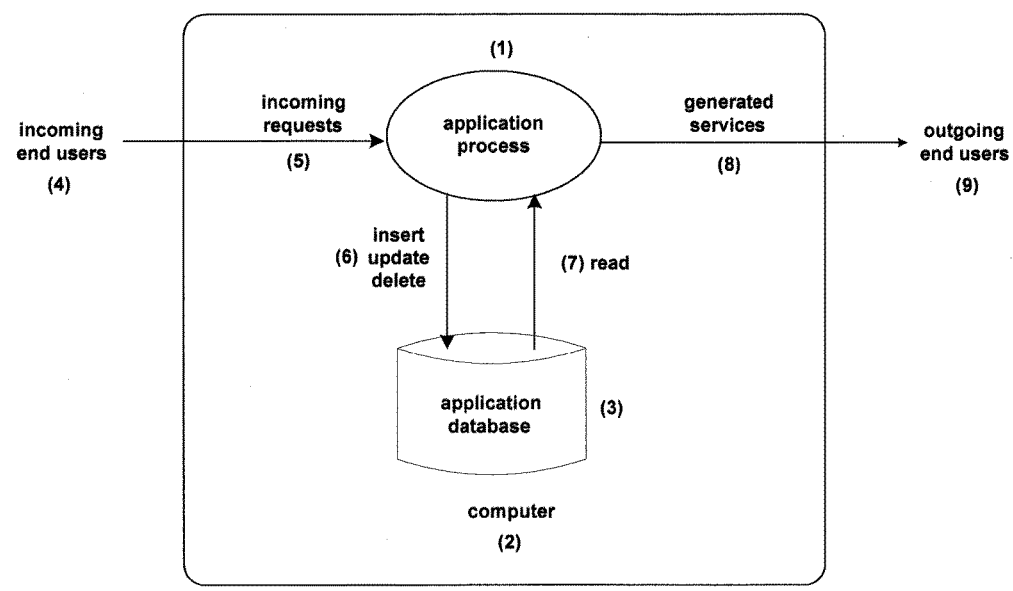
Figure 1: Prior Art - A Computer Application

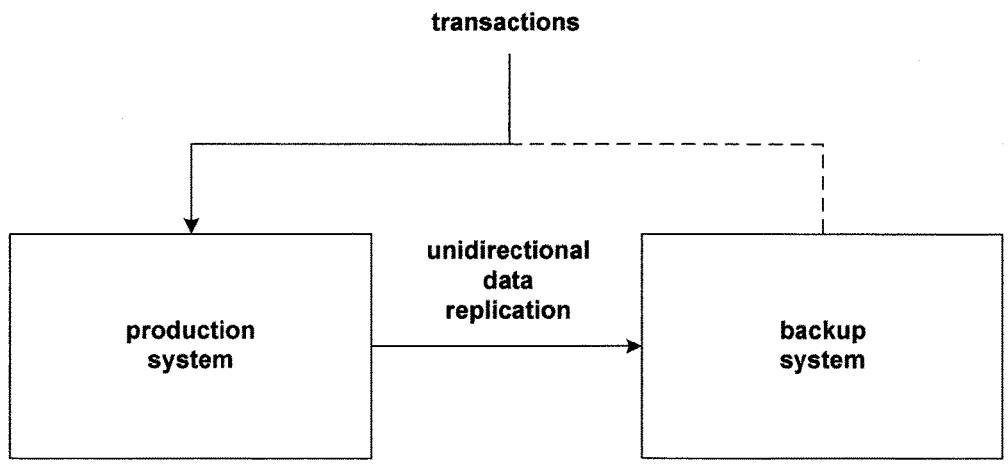
Figure 2: An Active/Backup System
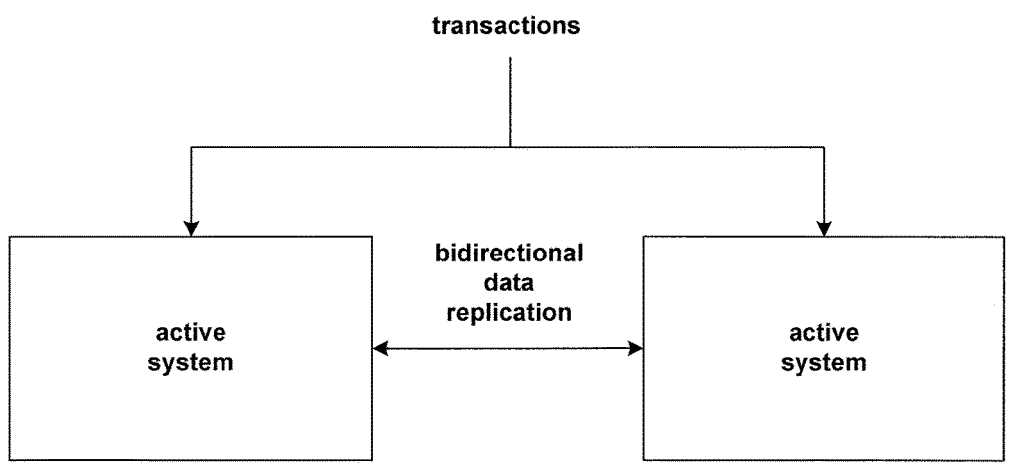
Figure 3: An Active/Active System

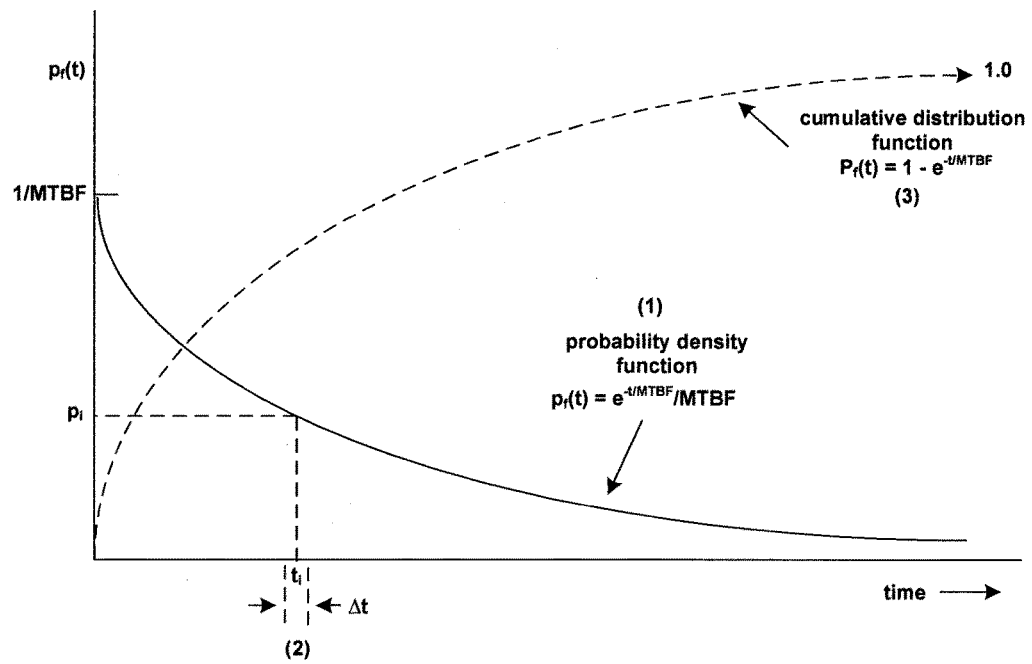
Figure 4: Prior Art - The Exponential Distribution
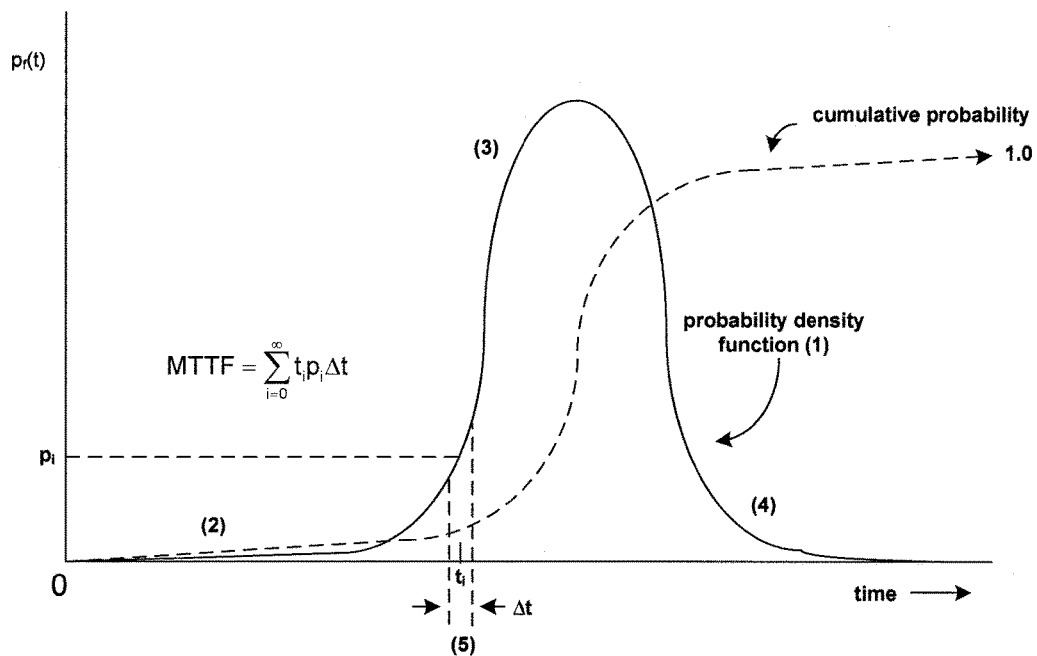
Figure 5: System Probability of Failure

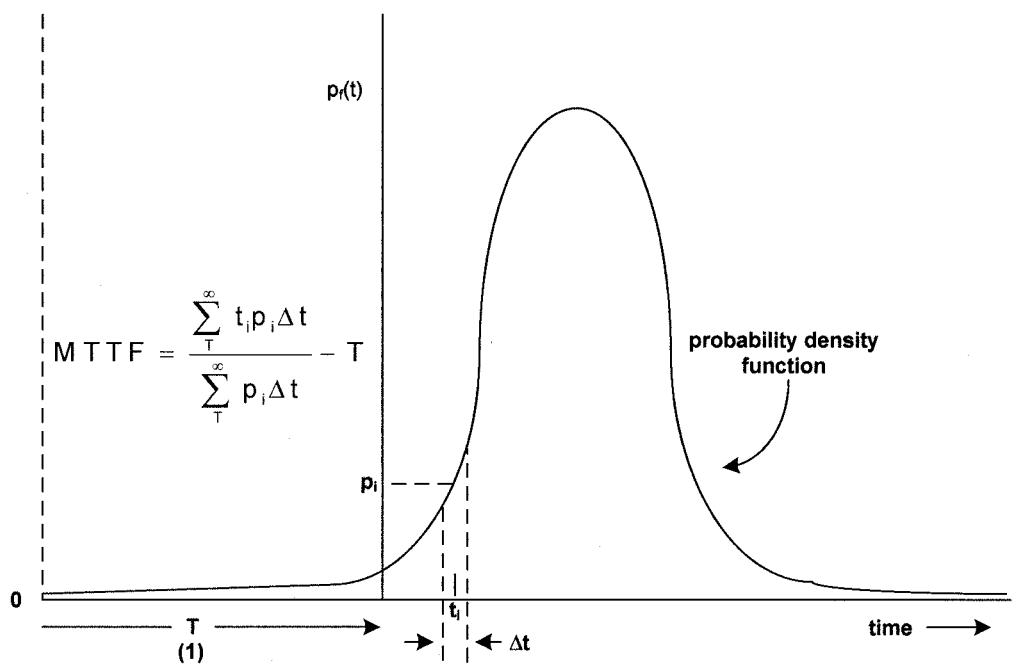
Figure 6: System Probability of Failure at a Later Time

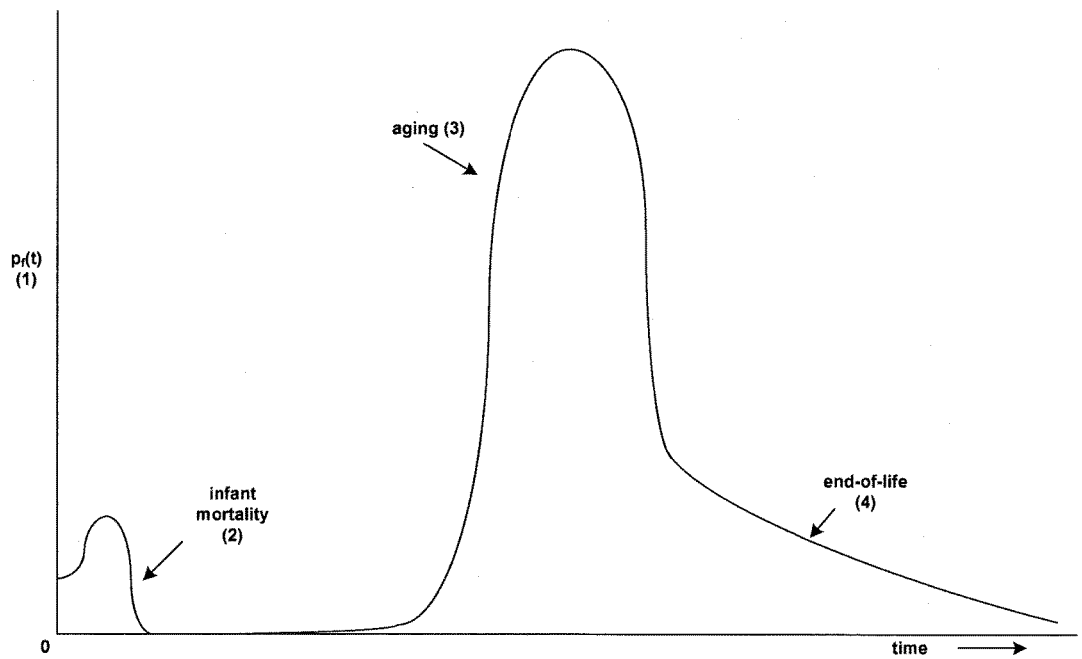
Figure 7: Typical Computer System Probability of Failure

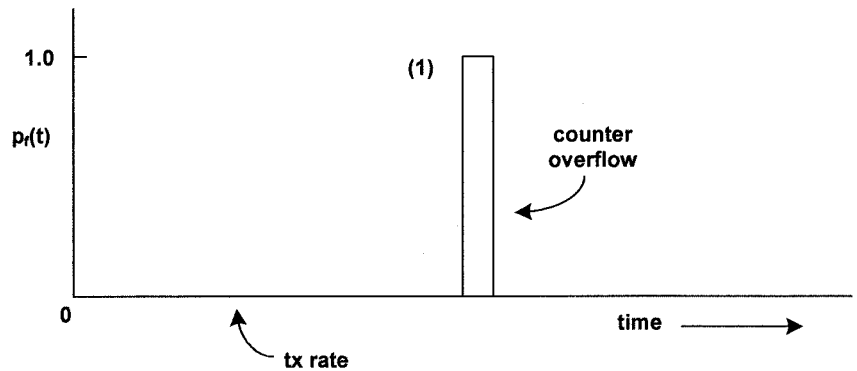
Figure 8: Software Counter Overflow Failure
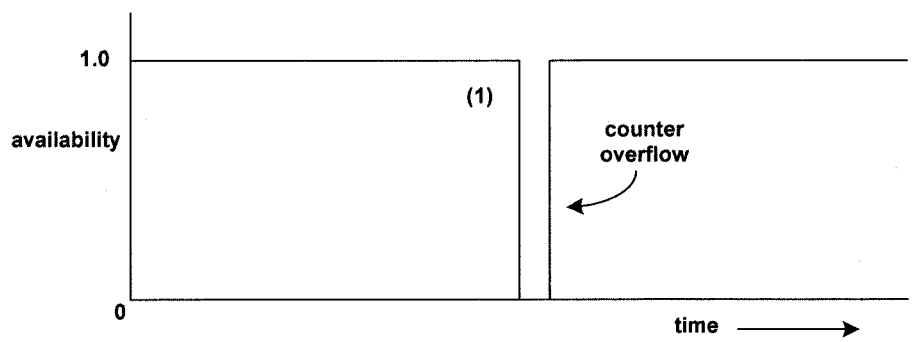
Figure 9: Availability Due to Software Counter Overflow

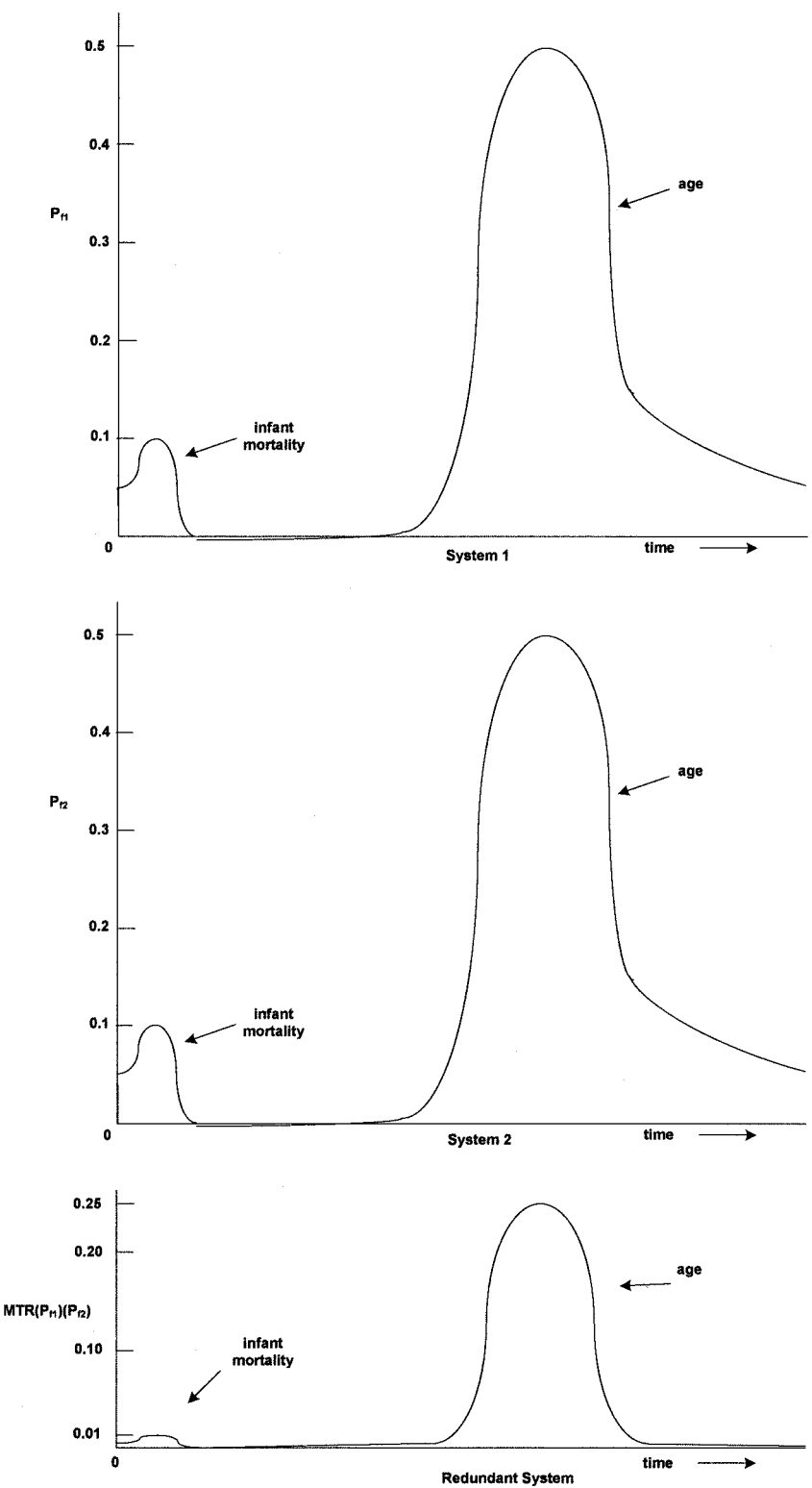
Figure 10: Probability of Failure of a Dually Redundant System

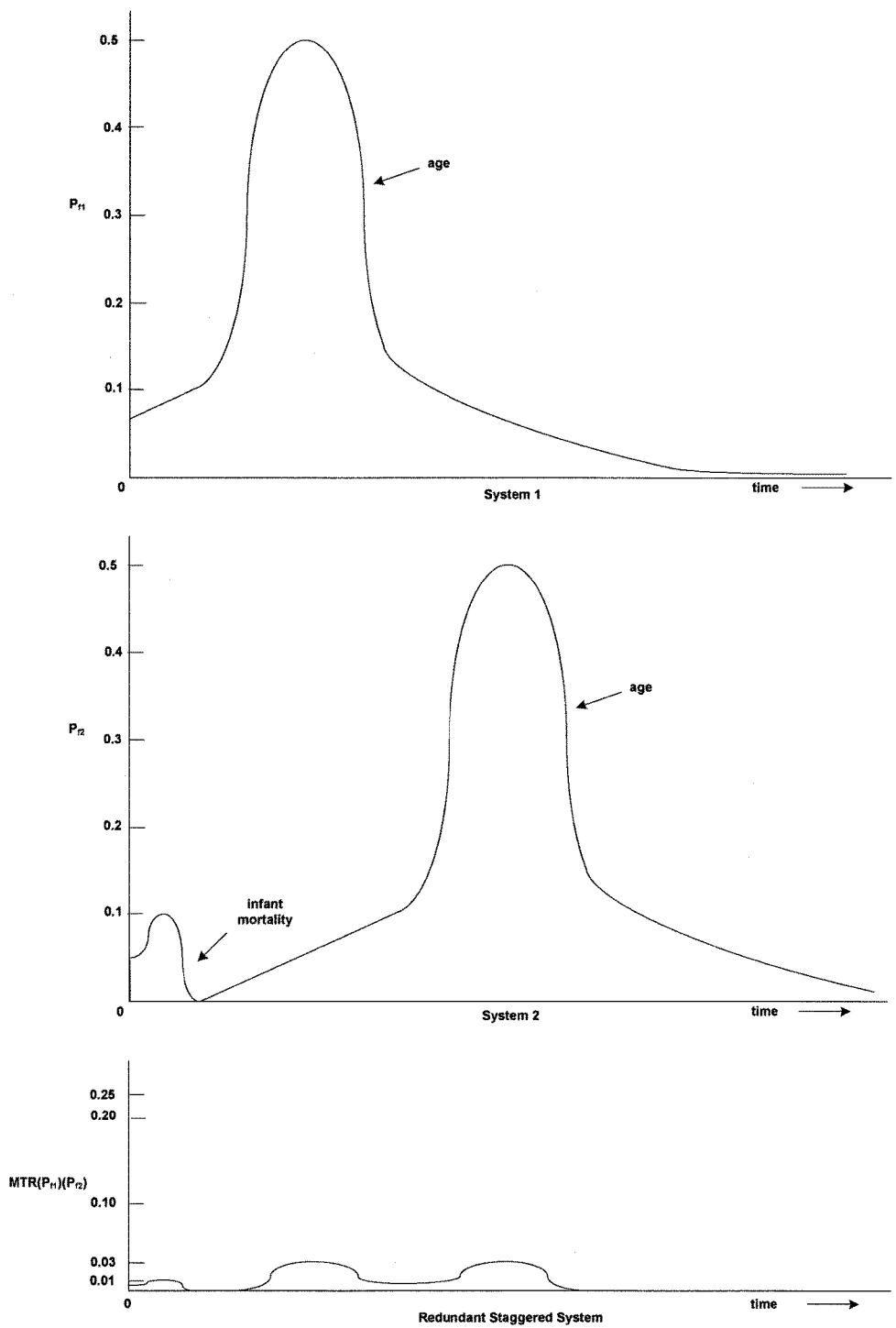
Figure 11: Staggered Starts of a Redundant Hardware System (for small MTR)

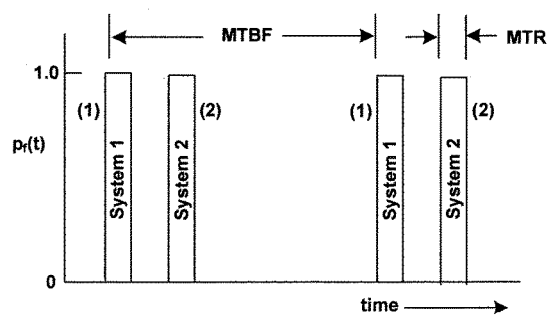
Figure 12: Software Counter Overflow Failure in a Staggered Redundant System
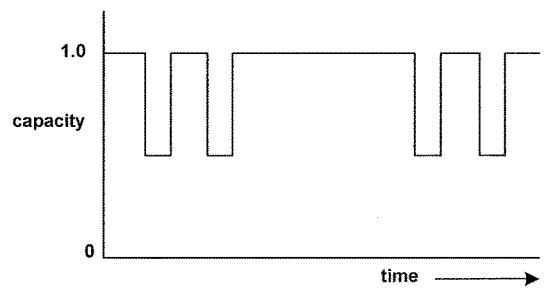
Figure 13: Availability Due to a Software Counter Overflow in a Staggered Redundant System

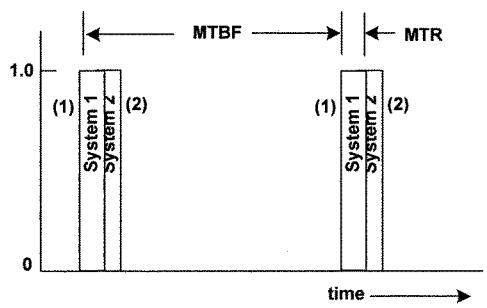
Figure 14: Software Counter Overflow Failure in an Insufficiently Staggered Redundant System
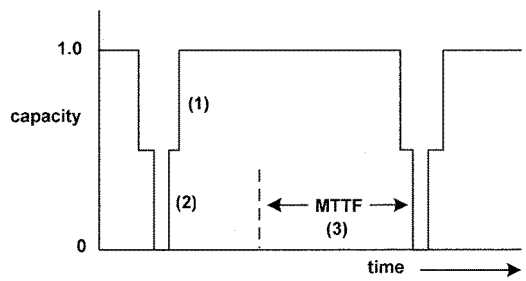
Figure 15: Availability Due to a Software Counter Overflow in an Insufficiently Staggered Redundant System

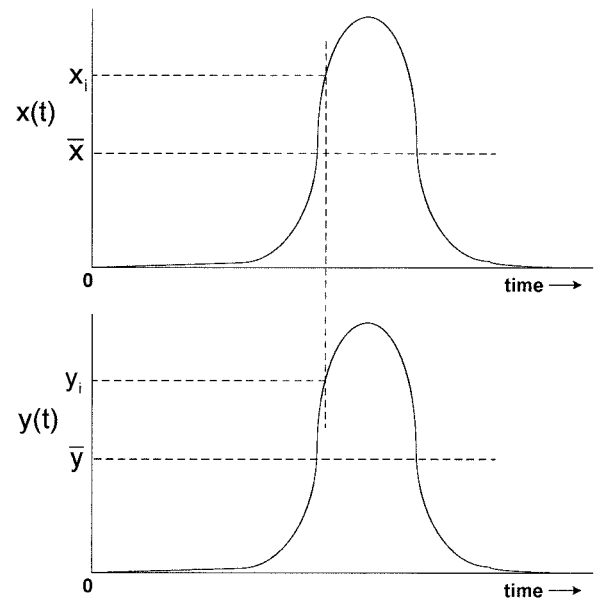
Figure 16: Highly Correlated Distributions
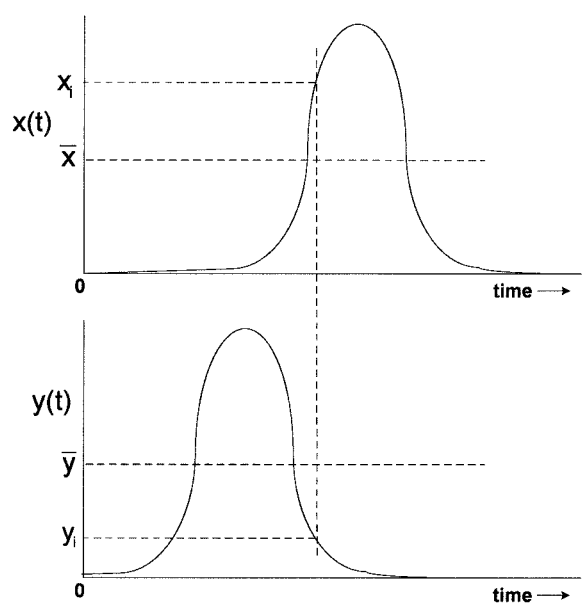
Figure 17: Poorly Correlated Distributions

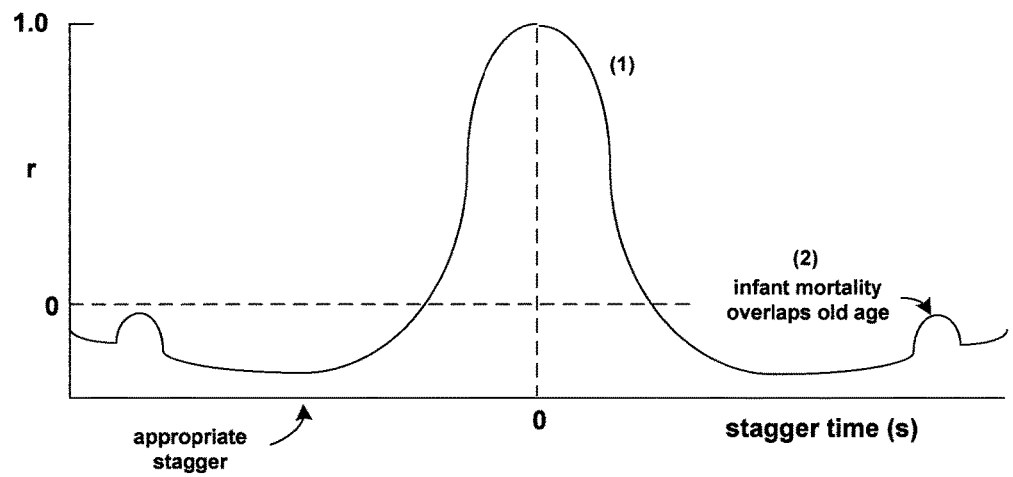
Figure 18: Correlation Coefficient *r* as a Function of Stagger Time
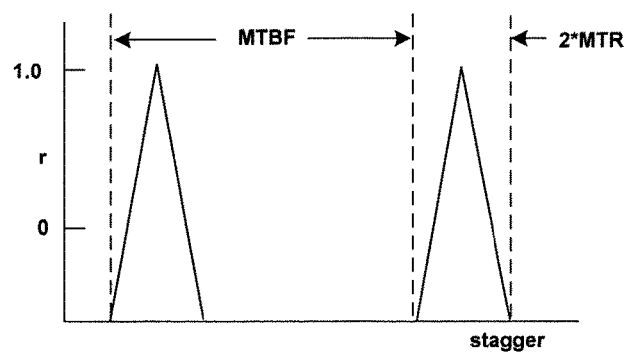
Figure 19: Correlation of Staggered Software Starts

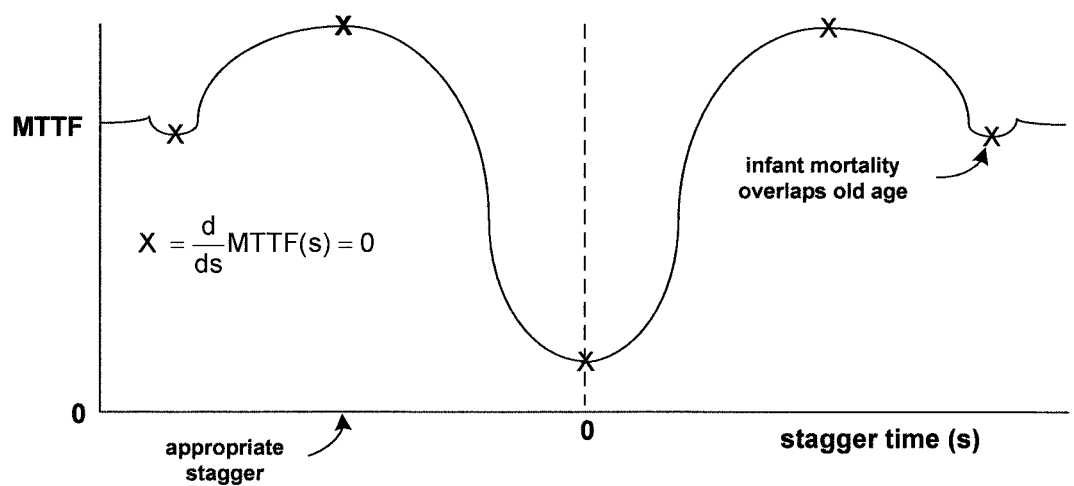
Figure 20: MTTF as a Function of Stagger Time

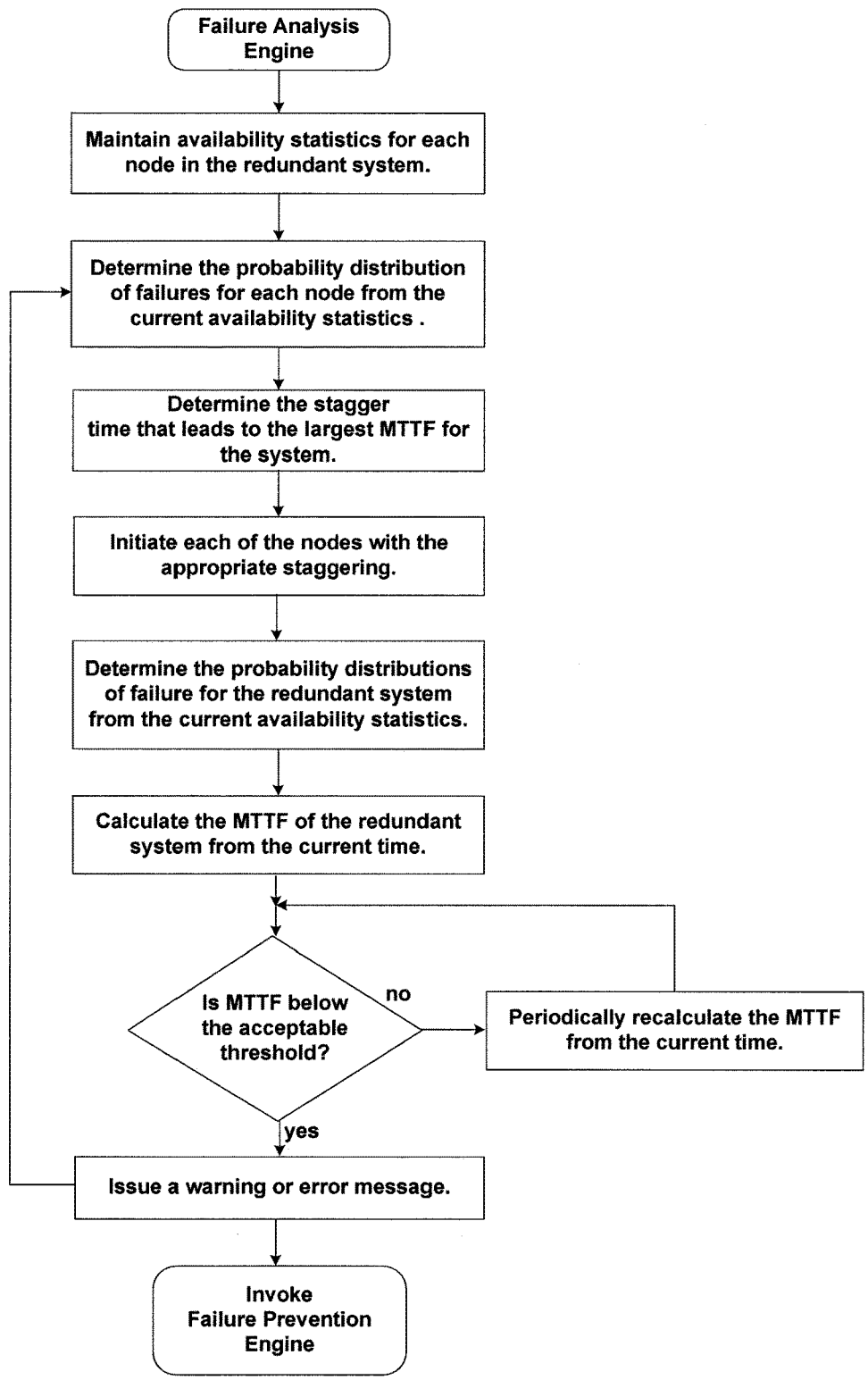
Figure 21: Flow Chart for the Failure Analysis Engine

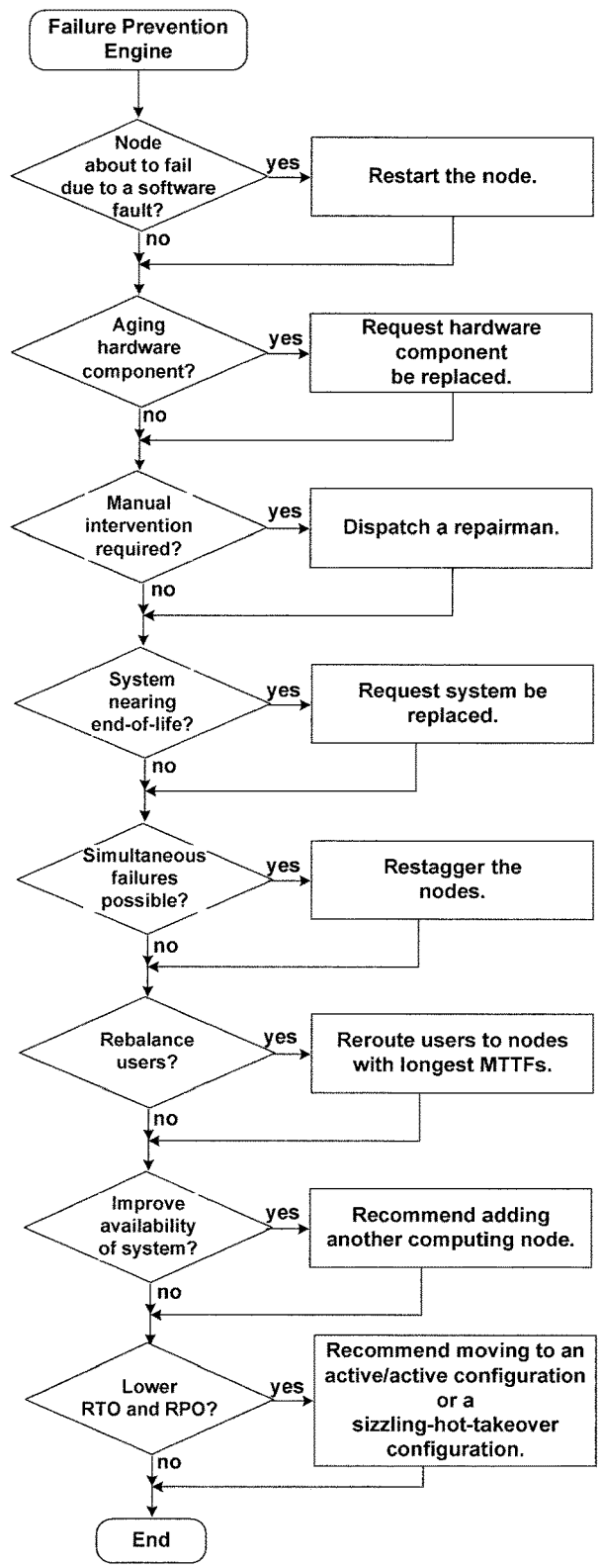
Figure 22: Flow Chart for the Failure Prevention Engine

METHOD AND SYSTEM FOR MITIGATING CORRELATED FAILURE MODES

BACKGROUND OF THE INVENTION

Certain terms used in the "Background of the Invention" are defined in the "Definitions" section below.

1.1 Computer Applications

Much of our daily lives is augmented by computers. The many services upon which we depend, our banking, communications, air and rail travel, online shopping, credit-card and debit-card purchases, mail and package delivery, and electric-power distribution, are all managed by computer applications.

In its simplest form, as shown in FIG. 1, a typical computer application is generally implemented as a computer program (1) running in a computer (2). A computer program is basically a set of computer-encoded instructions. It often is called an executable because it can be executed by a computer. A computer program running in a computer is called a process, and each process has a unique identification known to the computer. Many copies of the same computer program can be running in a computer as separately distinguishable processes.

An application typically includes multiple interacting processes.

1.2 Application Database

With reference to FIG. 1, an application often depends upon a database (3) of information that the application maintains to record its current state. Often, the information in the database is fundamental to the operation of the application, to the decisions it makes, and to its delivery of services to the end users.

The database may be stored in persistent storage such as a disk for durability, it may be stored in high-speed memory for performance, or it may use a combination of these storage techniques. The database may be resident in the same computer as the application program, it may be resident in another computer, it may be implemented as an independent system, or it may be distributed among many systems.

A database generally includes one or more files or tables, though it may be just a random collection of unorganized data. Each file or table typically represents an entity set such as "employees" or "credit cards." A file comprises records, each depicting an entity-set member such as an employee. A table comprises rows that define members of an entity set. A record comprises fields that describe entity-set attributes, such as salary. A row comprises columns that depict attributes of the entity set. In this specification, "files" are equivalent to "tables;" "records" are equivalent to "rows;" and "fields" are equivalent to "columns."

1.3 Requests

With further reference to FIG. 1, incoming end users (4) generate requests (5) to be processed by the computer application. End users may be people, other computer applications, other computer systems, or electronic devices such as electric power meters. In this specification, the term "end user" means any entity that can influence an application and/or can request or use the services that it provides.

An example of an incoming request from an end user is a request for a bank-account balance. Another example is an alert that a circuit breaker in a power substation has just tripped. In some cases, there may be no incoming request. For instance, a computer application may on its own generate random events for testing other applications.

1.4 Request Processing

As shown in FIG. 1, the application receives a request from an incoming end user (5). As part of the processing of this request, the application may make certain modifications to its database (6).

The application can read the contents of its database (7). As part of the application's processing, it may read certain information from its database to make decisions. Based on the request received from its incoming end user and the data in its database, the application delivers certain services (8) to its outgoing end users (9).

1.5 Services

A service may be delivered by an application process as the result of a specific input from an end user, such as providing an account balance in response to an online banking query. Another example of a service is the generation of a report upon a request from an end user or a report that is generated periodically.

Alternatively, the application program may spontaneously deliver a service, either on a timed basis or when certain conditions occur. For instance, an alarm may be generated to operations staff if the load being carried by an electric-power transmission line exceeds a specified threshold.

The end users providing the input to the application may or may not be the same end users as those that receive its services.

1.6 Availability

The availability of a computer system and the services it provides is often of paramount importance. For instance, a computer system that routes payment-card transactions for authorization to the banks that issued the payment cards must always be operational. Should the computer system fail, credit cards and debit cards cannot be used by the card holders. They can only engage in cash transactions until the system is repaired and is returned to service.

The failure of a 911 system could result in the destruction of property or the loss of life. The failure of an air-traffic control system could ground all flights in a wide area.

In mission-critical systems such as these, it is common to deploy two or more computer systems for reliability. Should one computer system fail, the other computer system is available to carry on the provision of services.

1.7 Redundant System

The availability of a computing system can be significantly enhanced by providing a second system that can continue to provide services to the end users should one system fail. The two systems can be configured as an active/backup system or as an active/active system. The systems are interconnected via a computer network so they can interact with each other.

In an active/backup system (FIG. 2), one system (the production system) is processing all transactions. It is keeping its backup system synchronized by replicating database changes to it so that the backup system is ready to immediately take over processing should the production system fail.

In an active/active system (FIG. 3), both systems are processing transactions. They keep each other synchronized via bidirectional data replication. When one system processes a transaction and makes changes to its database, it immediately replicates those changes to the other system's database. In that way, a transaction can be routed to either system and be processed identically. Should one system fail, all further transactions are routed to the surviving system.

1.8 The Calculation of Availability

1.8.1 The Prior-Art Calculation of System Availability

There is a large body of analytical techniques to calculate the reliability of a system. These techniques depend upon several parameters, such as the mean (average) time between failures of a single system (MTBF) and the mean (average) time to repair the system (MTR) once it has failed.

A common method to determine the availability of a redundant system uses the estimated MTBF and MTR of each system comprising the redundant system. The availability of a single system is defined as the probability that the system will be operational. If the system experiences a failure on the average of every MTBF hours and requires a time of MTR hours to repair, it will be down MTR/MTBF of the time; and it will be operational (MTBF−MTR)/MTBF of the time. Thus, Availability of a single system=(MTBF−MTR)/MTBF=1−MTR/MTBF  (1)

Let the availability of a single system be represented by a. Then, $a = 1 - MTR/MTBF$  (2)

The probability that a single system will be in a failed state is one minus the probability that it is operational. Let f be the probability that a single system is failed:

$f = 1 - a = MTR/MTBF$  (3)

The probability that both systems in a redundant pair will be failed is the probability that one system has failed AND the probability that the second system has failed. Let the probability of a dual system failure be F. Then, from Equation (3), $F = f \ast f = f^2 = (1-a)^2$  (4)

The probability that the redundant system will be operational (that is, at least one of the systems will be operational) is represented by A and is $A = 1 - F = 1 - (1-a)^2$  (5)

This is the common expression for the availability of a dually redundant system.

1.8.2 Memoryless Variables

In the above analysis, MTBF and MTR are random variables. That means that the probability of an event occurring in some small interval of time, $\Delta t$, is independent of what events have occurred in the past and that the occurrence of an event has no impact on events occurring in the future. The occurrence of an event is unaffected by the occurrence of other events. The variable is said to be memoryless because no event is affected by the occurrence of any other event.

For instance, assume that MTBF, the mean time between failures, is 1,000 hours. If we look at an operating system, we know that on the average, the next failure will occur in 1,000 hours. If we wait 500 hours, the average time to the next failure still will be 1,000 hours.

Likewise, let the average time to repair the system be four hours. When the system fails, it will take an average of four hours to repair it. However, if the system has been under repair for two hours, and if we ask the service technician what is the estimated time to complete the repair, his answer still will be four hours.

Clearly, memoryless variables for MTBF and MTR do not reflect the reality of the real world.

1.8.3 The Exponential Distribution

Random variables are characterized by the exponential distribution. The exponential distribution for MTBF is shown in FIG. 4 as a probability density function $p_f(t)$ (1) of the form $p_f(t) = e^{-t/MTBF}/MTBF$  (6)

$p_f(t)$ gives the probability that during any time interval $\Delta t$, where $\Delta t$ is arbitrarily small, the system will fail.

As shown in FIG. 4, the probability that the system will fail in the time interval $\Delta t$ at time $t_i$ (2) is $p_i \Delta t$. The average time that it will take the system to fail is the sum of the probabilities that it may fail at any time:

$$\text{Average time for the system to fail} = \sum_{i=0}^{\infty} t_i p_i \Delta t \quad (7)$$

As $\Delta t$ approaches zero, the summation becomes an integral:

$$\text{Average time for the system to fail} = \int_0^\infty t p_f(t) dt \quad (8)$$

Using our expression for $p_f(t)$ from Equation (6), $$\text{Average time for the system to fail} = \quad (9)$$
$$\int_0^\infty t(e^{-t/MTBF}/MTBF) dt = MTBF$$

Thus, we should expect the system to fail in an average time of MTBF.

If we wait for a time T, then the average time to the next failure is $$\text{Average time to next failure} = \quad (10)$$
$$\int_0^\infty (t-T)(e^{-(t-T)/MTBF}/MTBF) dt = MTBF$$

The average time to the next failure is still MTBF. Random variables characterized by the exponential distribution are indeed memoryless.

The integral of $p_f(t)$ over t gives the probability that the system will fail at some time within the time t. This is the cumulative distribution, $P_f(t)$ (3):

$$P_f(t) = \int_0^t (e^{-t/MTBF}/MTBF) dt = 1 - e^{-t/MTBF} \quad (11)$$

As t becomes large, $P_f(t)$ approaches 1. That is, the probability that the system will fail at some point is 1.

1.9 What is Needed

The prior art for calculating estimated availability from any point in time is flawed because it is based on memoryless random variables. The calculation of the average time to the next failure, MTBF, is always the same regardless of how long a system has been in service.

What is needed are methods to determine the actual availability of components as a function of time. This actual availability then can be monitored, and the MTTF (mean time to failure) for the system (that is, the expected time to the next failure from the current time) can be calculated continuously so that action can be taken should the MTTF fall below a specified threshold.

The MTTF can also be used to estimate the availability of a redundant system. If the system uses staggered starts, the MTTF will be much greater than if the two systems had been started simultaneously.

BRIEF SUMMARY OF THE INVENTION

It is common practice to start both systems in a redundant pair at the same time. However, this means that their failure probability distributions are closely correlated. When one system is likely to fail, so is the other system. This increases the probability of a dual system failure.

Significant increases in reliability can be obtained by staggering the starts of the two systems. In this way, their failure probability distributions do not line up. When the probability that one system will fail peaks, the probability of failure of the other system is likely to be significantly less, thus reducing the probability of a dual-system failure.

One purpose of the present invention is to estimate the mean time to the next failure (MTTF) of a system based upon its known statistical failure characteristics. In reality, the value of MTTF will vary over time. Certainly, as the system ages, the MTTF will usually become shorter.

By monitoring the MTTF via a Failure Analysis Engine, realistic decisions can be made to take certain actions to improve the availability of the system via a Failure Prevention Engine. For instance, if the current estimate of the system MTTF is 10,000 hours, no action need be taken. However, as time goes on, if the estimated MTTF should drop below 1,000 hours, the decision (in fact, the corporate policy) may require that the system be replaced with a new system, thus returning the system's MTTF to an acceptable value.

By monitoring MTTF with a Failure Analysis Engine and ensuring that the system always exhibits an acceptably high value of MTTF via a Failure Prevention Engine, the availability of the system is significantly enhanced.

It is a further purpose of the present invention to use staggered starts in redundant systems. If the systems are started simultaneously, their peak probabilities of failure will align and increase the probability of a dual system failure. If their starting times are staggered so that the failure probability distributions are not closely correlated, then the time when one system is most likely to fail will not be the same time that the other system is likely to fail; and the reliability of the redundant system will be significantly increased.

BRIEF DESCRIPTION OF DRAWINGS

Preferred embodiments of the present invention will now be described by way of example with reference to the accompanying drawings:

FIG. 1 shows a prior-art computer application.

FIG. 2 shows a prior-art active/backup system with nodes connected by a computer network.

FIG. 3 shows a prior-art active/active system with nodes connected by a computer network.

FIG. 4 shows the prior-art exponential distribution.

FIG. 5 shows the calculation of MTTF from a failure probability distribution.

FIG. 6 shows the calculation of MTTF from a failure probability distribution at a later time.

FIG. 7 shows a typical computer system failure probability distribution.

FIG. 8 shows the failure probability distribution for a typical software failure.

FIG. 9 shows the availability for a typical software failure.

FIG. 10 shows the failure probability distribution of a dually redundant computer system.

FIG. 11 shows the failure probability distribution of a redundant system with staggered starts of the hardware.

FIG. 12 shows the failure probability distribution of a redundant system with staggered starts of the software.

FIG. 13 shows the availability of a redundant system with staggered starts of the software.

FIG. 14 shows the failure probability distribution of a redundant system with insufficiently staggered starts of the software.

FIG. 15 shows the availability of a redundant system with insufficiently staggered starts of the software.

FIG. 16 shows a pair of highly correlated distributions.

FIG. 17 shows a pair of poorly correlated distributions.

FIG. 18 shows the correlation coefficient for typical staggered hardware starts.

FIG. 19 shows the correlation coefficient for typical staggered software starts.

FIG. 20 shows MTTF as a function of stagger time.

FIG. 21 shows a flow chart for a Failure Analysis Engine.

FIG. 22 shows a flowchart for a Failure Prevention Engine.

DETAILED DESCRIPTION OF THE INVENTION

Certain terminology is used in the following description for convenience only and is not limiting.

The words "a" and "an", as used in the claims and in the corresponding portions of the specification, mean "at least one."

Definitions

The following definitions describe the use of certain terms in this specification. They are hierarchically ordered in that each definition builds on previous definitions.

Table—A set of data values that is organized using a model of horizontal rows and vertical columns. The columns are identified by name, and the rows are uniquely identified by the values appearing in a particular column subset (the table's primary key). A table usually characterizes an entity set. Each row in the table describes an instance of the entity set. Each column describes an attribute of the entity set.

File—The equivalent of a table for nonrelational databases. A file is made up of records, and each record describes an entity instance. A record is made up of fields, each of which describes an attribute of the entity set. In this specification, the term "table" or "file" is to be interpreted as "table and/or file."

Column—A table component that holds a single attribute, such as SALARY, of the entity set.

Field—A file component that holds a single attribute, such as SALARY, of the entity set. In this specification, the term "column" or "field" is to be interpreted as "column and/or field."

Row—A table component that represents an entity instance. It is a sequence of {column name, value} pairs usually implemented as a sequence of values positioned according to their corresponding column names. For instance, (EMPLOYEE NUMBER, 235), (NAME, Joe Smith), (DEPARTMENT, Accounting), (SALARY, $30, 000).

Record—The same as a row, but "row" is usually used for relational databases; and "record" is usually used for file systems. In this specification, the term "row" or "record" is to be interpreted as "row and/or record."

Database—A collection of related tables or files.

Insert—The addition of a row into a database.

Update—The modification of a row in a database.

Delete—The removal of a row from a database.

Change—An insert, update, or delete.

Function—A logical implementation of a task or service.

Program—An executable set of programming code for providing a specific function or set of functions.

Executable—A program.

System—A processor with memory and input/output devices that can execute a program.

Computer—A system.

Node—A computer that is one of the two or more nodes, i.e. systems, that is making up a redundant system.

Process—A program running in a computer. A process provides one or more functions. One program can be spawned as multiple distinguishable processes.

Application—One or more processes cooperating to perform one or more useful functions for end users.

Operating System—A software facility that manages computer hardware resources and provides common services for application processes. Services include time functions, reading and writing interprocess messages, and database manipulation.

End Users—People, systems, devices, applications, or any other entity that can influence an application or can request or use the services that it provides.

Mean—The average of a probability distribution.

MTBF—Mean time between failures.

MTTF—Mean time to failure (that is, the mean time from the current time to the next failure).

MTR—Mean time to repair.

Probability Density Function—A function that describes the relative likelihood that a variable will take on a given value. It is the derivative of the variable's cumulative distribution function.

Cumulative Distribution Function—The probability that a variable will be found to have a value less than or equal to a specified value. It is the integral of the variable's probability density function.

Active/Backup System—A redundant system architecture in which an active production system is backed up by a passive system that may be doing other work. Should the active system fail, the backup system is brought into service; and the application continues running on the backup system. Failover from a failed active system to the backup system can take some time, ranging from minutes to hours. Furthermore, the failover may not work (a failover fault).

Active/Active System—A redundant system architecture in which two or more computing systems are actively processing transactions for the same application. Should one system fail, recovery only entails sending further transactions to the surviving system(s). Failover typically can be accomplished in seconds, and there are no failover faults (the surviving systems are known to be working).

Redundant System—A system architecture which consists of two or more systems (i.e. nodes) that are operating in a way to increase the overall availability of the application to end users. Active/Backup and Active/Active Systems are the two primary redundant system architectures.

Sizzling-Hot Takeover (SZT) system—An active/active architecture in which only one computing system is processing transactions. An SZT system avoids the problems that an application might face if run in a distributed environment, but it has the fast and reliable failover characteristics of an active/active system.

Stagger—The time difference between starting the two or more systems (i.e. nodes) in a redundant system.

Failure Analysis Engine—A facility that maintains the availability statistics for a system (including MTBF, MTR, and MTTF), that calculates the probability distribution for MTTF, and that estimates the average time to the next system failure (the mean of MTTF).

Failure Prevention Engine—A facility that performs one or more appropriate actions based upon the availability predictions of the Failure Analysis Engine in order to increase the availability of the application.

DETAILED DESCRIPTION

The availability of a system is the probability that it can provide its services to the end users. System availability is determined by the mean time between failures (MTBF) of the system, by the mean time to the next failure (MTTF) of the system, and by the mean time to repair (MTR) the system. To ensure the availability of the system, it is important to know at any point in time when the next failure is expected to occur (MTTF) (of course, an actual failure could occur before or after the expected failure time). By knowing the current MTTF of the system, corrective action can be taken to improve the MTTF should it reach a critical lower threshold.

The MTTF of a redundant system can be significantly improved by staggering the starts of the two systems. In this way, the peak probability of failure of one system is not aligned with the peak probability of the other system. When one system is most likely to fail, the failure of the other system is unlikely, thus minimizing the probability of a dual-system failure.

1.10 Failure Analysis Engine

The prior art of using the exponential distribution to characterize MTTF is flawed in that it is memoryless. The value it provides for MTTF is independent of when the observation begins.

In real-world systems, the probability of the failure of the system in any particular time interval increases as time goes on. It is the task of the Failure Analysis Engine to continually compute the current MTTF and compare it to a specified acceptable minimum MTTF. Should the MTTF fall below an acceptable limit, the Failure Analysis Engine issues an alert and notifies the Failure Prevention Engine, as described in Section 1.14, "Failure Prevention Engine."

An example of the probability density function for a typical system is shown in FIG. 5. (The probability density function for a typical system may or may not match a Bell curve.) The probability density function is shown as a plot (1) of the probability of failure at any point in time, $p_f(t)$, as a function of time, t.

In this example, the probability of failure is initially quite low (2). Then, as the system ages, the probability of failure increases as the system becomes less reliable (3). After a while, the probability of failure again goes down because the system most likely already has failed (4).

As described earlier in Equation (7) for the exponential distribution, at any time $t_i$, the probability that the system will fail in a small time interval $\Delta t$ is $p_i \Delta t$ (5). The average system failure time is $$\text{Average time for the system to fail} = MTTF = \sum_{i=0}^{\infty} t_i p_i \Delta t \quad (12)$$

As $\Delta t$ approaches zero, this becomes the continuous function $$\text{Average time for the system to fail} = MTTF = \int_0^{\infty} t p(t) dt \quad (13)$$

Let us now look at the same system at some later time, as shown in FIG. 6. A time T has passed (1), and the calculation of MTTF is made again. Now, each $t_i$ in the above equation is replaced by $(t_i-T)$:

Average time for the system to fail =

$$MTTF = \frac{\sum_{i=T}^{\infty}(t_i - T) p_i \Delta t}{\sum_T^{\infty} p_i \Delta t} = \frac{\sum_T^{\infty} t_i p_i \Delta t}{\sum_T^{\infty} p_i \Delta t} - T \quad (14)$$

where the equation is normalized to account for the shorter time. Comparing Equation (12) to (14), the value of the summation in the numerator is less; and the calculated value of MTTF is less. As time has progressed, the expected time to failure typically has come closer (provided the peak of the failure probability distribution has not passed—then it is extended). This is the way the real world works.

It is the task of the Failure Analysis Engine to continually calculate the current MTTF as described above so that decisions can be made as to corrective actions, if any, to take to improve MTTF should it fall below an acceptable threshold.

1.11 A Typical Hardware Failure Probability Distribution

The failure probability distribution for a typical computer system is depicted in FIG. 7, including infant mortality. This figure reflects the probability density function $p_f(t)$ as a function of time (1). When the system is first installed, there is a minor increase in the probability of failure due to "infant mortality" (2). This is due to faults in the manufacture of the system. Undetected in final system testing at the factory, the faults become apparent during the early stages of operation.

Once the system is "burned in," it remains very reliable until it begins to age. After a certain point in time, components begin to wear out; and the failure probability of the system escalates significantly (3). After a certain point in time, the system most likely has failed already. The probability of a failure after that point becomes less (4).

1.12 A Typical Software Failure Probability Distribution

Software has different failure modes than hardware. Typically, a software programming bug lurks in the application or operating system in an area that seldom gets executed. When it does, however, the software may fail.

Alternatively, a variable used by the software to count events may overflow. At that point, the application may crash. Such an example can be seen in FIG. 8. The software initially operates flawlessly. However, it contains a transaction counter that is incremented after the processing of every transaction. At some point (1), the transaction counter overflows; and the software crashes. At this point, the system is out of service until it is repaired, typically by reloading the software.

FIG. 9 shows the availability of the system. The system has a current availability of 1 until the software crash. At that point, it has an availability of zero until the system is returned to service. Note that the system at a particular instant in time is either available or unavailable. If we calculate an availability of say 0.9998, that is the probability that during some future interval of time the system will be available when we go to use it. With a probability of 0.0002, the system will be unavailable when we go to use it.

1.13 Redundant System

To improve the reliability of a computer system to end users, it is often made redundant by providing two or more cooperating systems in the overall system. For instance, the overall system may contain two computer systems. In an active/backup configuration, one system is acting as the production system; and the other system is standing by to take over in the event that the production system fails. In an active/active system, both systems are actively participating in the application. Should one system fail, all transactions are routed to the surviving system.

1.13.1 Probability of a Dual System Failure

A redundant system is available as long as one of the systems is operational. The redundant system fails only if both systems fail. The probability density function of a redundant-system failure can be determined by calculating the probability that one system will fail and that the other system will subsequently fail while the first system is still down. As described later, the probability of failure of the redundant system can be significantly reduced by staggering the starting time of the two systems. Let s be the stagger time as defined later in Section 1.13.3, "Staggered Starts of Hardware Systems," and Section 1.13.4, "Staggered Starts of Software Systems."

Let p(t) be the probability density function of a system failure. For discussion purposes, the two systems of the redundant pair are named System 1 and System 2. On the average, System 1 will fail at time MTTF. It will take a time of MTR to return it to service. The probability $F_1(t)$ that System 1 will still be failed at some later time t is $$F_1(t) = \int_{t-MTR}^{t} p_1(t') dt' \quad (15)$$

where $p_1(t')$ is the probability density function for System 1 failing at time t'.

The probability density function for System 2 failing at time t is $p_2(t-s)$, since its starting time is delayed by the stagger time s. Therefore, the probability density function for System 2 failing at time t while System 1 is down is $p_2(t-s)F_1(t)$. The probability that System 2 will fail by time T while System 1 is failed is given by the convolution $$\text{probability of a dual system failure} = \int_0^T \left[ p_2(t-s) \int_{t-MTR}^{t} p_1(t') dt' \right] dt \quad (16)$$

If MTR is small, Equation (16) can be simplified, since $p_1(t)$ will be almost constant over the time interval MTR. Thus, $$\text{Probability of a dual system failure as } MTR \to \text{a small value} \sim \qquad (17)$$

$$\lim_{MTR \to 0} \int_0^T \left[ p_2(t-s) \int_{t-MTR}^t p_1(t')dt' \right] dt \sim MTR \int_0^T p_2(t-s)p_1(t)dt$$

1.13.2 Availability of a Redundant System

FIG. 10 shows the failure characteristics of a dually redundant system. The system comprises System 1 and System 2, both of which have the hardware failure characteristics described in Section 1.11, "A Typical Hardware Failure Probability Distribution," and illustrated in FIG. 7. The combined system has a probability distribution of failure that is the product of the individual probability distributions of failure of the individual systems multiplied by MTR. This probability distribution is shown as the bottom curve of FIG. 10. The probability-of-failure curves all have the same dimensions. It is clear that the redundant system has a higher availability (i.e., a lower probability of failure) than either of the individual systems if MTR is very small relative to the system operating timescale.

1.13.3 Staggered Starts of Hardware Systems

FIG. 10 indicates the failure characteristics of the redundant system based on both systems being started at the same time. However, significant improvements in availability can be obtained by staggering the startups of the two systems as shown in FIG. 11. By doing so, the peak failure rates of the two systems can be structured to occur at different times, thus significantly reducing the risk of a dual failure. Note the dramatically reduced peak probability failure with staggered starts as depicted in FIG. 11, and thus the increase in availability, compared to that in FIG. 10 when the two systems are started at the same time.

1.13.4 Staggered Starts of Software Systems

Similar benefits can be obtained by staggering software starts. Consider the counter overflow problem described in Section 1.12, "A Typical Software Failure Probability Distribution." FIG. 12+shows the counter overflow occurring in a redundant system comprising System 1 and System 2. If both software systems were started concurrently, it is likely that both would experience counter overflows at about the same time.

However, by staggering the software starts, as shown in FIG. 12, the software faults for System 1 (1) and for System 2 (2) are quite unlikely to occur at the same time. Consequently, when one system fails, the other system will still be operational and will continue to provide half of the processing capability for the system. Thus, the system's services are still available to the end users. This is indicated in the availability diagram of FIG. 13.

If the software systems in FIG. 12 are not properly staggered, the software failures may overlap and cause a total system failure. FIG. 14 shows the two systems not sufficiently staggered to avoid an overlap of failures. FIG. 15 shows the resultant capacity. When one system fails, the overall capacity is reduced to 0.5 (1) because the other system remains available to the users. However, if the second system fails while the first system is still in failure mode, the overall system availability is reduced to zero (2).

The MTTF at any given time (3) is the average time to the next total system failure (2).

1.13.5 Correlation

Based on the above discussions of staggered starts, it is important to determine starting sequences that provide the minimum of correlation between the failure modes of the systems. In this way, the probability of both systems failing at the same time is minimized, thus increasing overall system availability.

The correlation between two failure modes can be determined by calculating the correlation coefficient. It is a quantitative measure showing meaningful statistical relationships between two (or more) observed distributions. It is defined as the covariance of the samples of variables divided by the product of their sample deviations.

If we have one dataset $\{x_1 \ldots x_n\}$ containing n values and another dataset $\{y_1 \ldots y_n\}$ containing n values, the formula for Pearson's correlation coefficient, r, is $$r = \frac{\sum_{i=1}^{n}(x_i - \bar{x})(y_i - \bar{y})}{\sqrt{\sum_{i=1}^{n}(x_i - \bar{x})^2} \sqrt{\sum_{i=1}^{n}(y_i - \bar{y})^2}} \qquad (18)$$

where $\bar{x}$ and $\bar{y}$ are the means of x and y respectively.

The meaning of the correlation coefficient can be seen more clearly graphically, as shown in FIG. 16 and FIG. 17. FIG. 16 shows two highly correlated distribution functions, x(t) and y(t). Note that at each point in time, $(x_i-\bar{x})$ and $(y_i-\bar{y})$ are either both positive or negative. Therefore, the correlation coefficient, r, is positive since the summation in the numerator, $(x_i-\bar{x})(y_i-\bar{y})$, is always positive.

Similarly, FIG. 17 shows two distribution functions that are poorly correlated. At many points in time when $(x_i-\bar{x})$ is positive, $(y_i-\bar{y})$ is negative and vice versa. Therefore, the numerator in r can become negative and r will be negative.

Note that for a pair of perfectly correlated functions, $(x_i-\bar{x})=k(y_i-\bar{y})$, where k is some constant. In this case, r is equal to 1. For a pair of functions that are exactly anti-correlated, $(x_i-\bar{x})=-k(y_i-\bar{y})$, and r is equal to -1. Therefore, the correlation coefficient, r, ranges from +1 for perfectly correlated functions to -1 for perfectly anti-correlated functions. A correlation coefficient of zero indicates that there is no correlation between the functions.

The optimal value for the stagger time s is that value that minimizes the correlation between the failure probability distribution for System 1 and System 2. Assuming that the failure probability distributions for System 1 and System 2 are nearly identical, the correlation coefficient, r, will be +1.0 when they are started simultaneously (s=0). As their starting times are staggered, the correlation coefficient will decrease. Ultimately, it will increase as the starting times become once again correlated. The stagger time at which the correlation coefficient reaches its minimum value is the stagger time that will lead to the maximum redundant system reliability.

FIG. 18 shows the effect of hardware staggering on correlation. When there is no stagger (stagger=0), the distributions are highly correlated and provide the poorest availability (1). As the stagger is increased, the correlation decreases, with a little bump when the infant mortality of one overlaps the aging failures of the other (2). Further staggering will bring the distributions back into synchronization with high correlation.

FIG. 19 shows the effect of software staggering on correlation. The case of two systems with failures due to counter overflows, as shown in FIG. 12 and FIG. 14, is used as an example. When the two systems have little or no failure overlap, the correlation coefficient is negative. However, as soon as the system failure probabilities begin to overlap, their correlation approaches one; and the redundant system more likely will fail. The correlation coefficient will remain one until the stagger increases to the point that there is no longer any overlap. This requires an increase in the stagger of a time equal to 2*MTR.

It is a further task of the Failure Analysis Engine to recommend a staggering time that will maximize the MTTF and minimize the likelihood of a dual node outage leading to the loss of the system.

1.13.6 Determining the Optimal Stagger Time

A typical relation of MTTF to stagger time is shown FIG. 20. The relation of MTTF to stagger time shown in FIG. 20 corresponds to the correlation coefficient as a function of stagger time shown in FIG. 18. When the correlation between the failure probability distributions for System 1 and System 2 is high, MTTF is relatively short. However, as the correlation coefficient drops, MTTF increases.

The optimal stagger time is that which results in the largest value for MTTF. As described in the derivation of Equation (16), the probability of failure of the dual system at time t is $$\text{probability density of a dual system failure} = p_2(t-s)\int_{t-MTR}^{t} p_1(t')dt' \quad (19)$$

The MTTF for this system as a function of the stagger time s, MTTF(s), is $$MTTF(s) = \int_0^\infty t\left[p_2(t-s)\int_{t-MTR}^{t} p_1(t')dt'\right]dt \quad (20)$$

One may graphically pick s corresponding to the maximum MTTF from a graph as shown in FIG. 20, or one may differentiate Equation (20) with respect to s and set the result to zero.

$$\frac{d}{ds}MTTF(s) = 0 \quad (21)$$

Typically, this will yield several values of s that satisfy Equation (21). Each will represent either a minimum point or a maximum point for MTTF, as indicated in FIG. 20. Equation (20) must be solved for each of these values of s to determine which one yields the maximum MTTF. That value of s is the optimal stagger time.

1.14 Failure Prevention Engine

If the Failure Analysis Engine detects that the MTTF of the system has reached a minimum acceptable value, it will issue an alert and will notify the Failure Prevention Engine, as described in Section 1.10, "Failure Analysis Engine." The Failure Prevention Engine can take any number of actions to improve the current availability of the system by increasing its MTTF. For instance, it may restart a node, recommend that a hardware component be replaced, adjust the staggering of the systems, or request that a repairman be called, among other actions (see Section 1.15.3, "Failure Prevention Engine," for a more complete list).

1.15 Methods for Improving Availability of Redundant Systems

The availability of a redundant system can be improved by starting the two systems at different times, the stagger time. The initial stagger time is determined by the probability distribution of failures (the maintained current availability statistics) for each system in the redundant system.

The availability of the redundant system can be further improved during its operation by incorporating a Failure Analysis Engine that continually monitors the current MTTF of the system and a Failure Prevention Engine that performs one or more appropriate actions to increase the availability of the system should its MTTF fall below an acceptable value as determined by the Failure Analysis Engine. Typical actions taken by the Failure Analysis Engine and the Failure Prevention Engine are reflected in the flowcharts of FIG. 21 and FIG. 22.

1.15.1 Initiating System Operation

Before starting the redundant system, the failure probability distributions and the MTRs of the two systems are used to determine the optimum stagger time to maximize MTTF. The first system is put into operation, and at a later time equal to the stagger time, the second system is put into operation.

Thereafter, the Failure Analysis Engine continually recalculates MTTF and calls upon the Failure Prevention Engine to take remedial action if the MTTF falls below a specified threshold.

1.15.2 Failure Analysis Engine

Typical functions for a Failure Analysis Engine are shown in the flowchart of FIG. 21. The functions typically include the following steps:

1. Maintain current availability statistics for each system in the redundant system. These statistics may be loaded from archives or determined as the system is operating.
2. Determine the probability distribution of failures from the maintained current availability statistics for each system in the redundant system.
3. Determine the stagger time (i.e., the optimal differential start time) that leads to an optimal (typically largest) MTTF. If needed, start/initiate the systems according to the selected stagger time.
4. With the distributions of the two systems appropriately staggered and started, periodically determine the ongoing probability distribution of failure for the redundant system from the maintained current availability statistics.
5. Periodically recalculate the MTTF of the redundant system for the current time from the ongoing probability distribution of failure for the redundant system.
6. If the MTTF falls below one of a plurality of critical threshold levels, issue a warning or error message; and inform the Failure Prevention Engine.
7. When the Failure Prevention Engine completes whatever actions it is going to take, return to Step 1.

The order of the steps taken by the Failure Analysis Engine may vary depending on the nature of the redundant system. For example, a default stagger time might be saved in the archives and the nodes of the redundant system can be started before steps 2 and 3.

1.15.3 Failure Prevention Engine

When the Failure Prevention Engine is notified by the Failure Analysis Engine that the redundant system MTTF has fallen below an acceptable threshold, it will take actions to improve the availability of the redundant system to lengthen its MTTF. Typical actions may depend upon the particular threshold value below which the MTTF has fallen.

Typical actions are shown in the flowchart of FIG. 22 and include:
1. Restart a node if it is about to fail due to a software problem.
2. Replace a critical hardware component if hardware failures happen after some period of time (such as a solid-state disk drive).
3. Dispatch a repairman if manual intervention is required.
4. Replace the redundant system in its entirety if it is nearing end-of-life.
5. Restart the nodes according to a staggering schedule if both nodes are apt to fail simultaneously from a software or hardware problem.
6. Reroute users to the node with the lowest probability of failure (i.e., the longest nodal MTTF).
7. Add another node to the redundant system (i.e. a network of nodes) such that the overall probability of failure of the redundant system is reduced.
8. Move to an active/active configuration (in which both nodes are processing transactions) or to a sizzling-hot-takeover configuration (an active/active system in which only one node is processing transactions) to lower the recovery time (Recovery Time Objective, or RTO) and the amount of data loss (the Recovery Point Objective, or RPO).

1.16 Summary

The prior art for calculating estimated availability from any point in time is flawed because it is based on memoryless random variables. The calculation of the average time to the next failure is always the same regardless of how long a system has been in service.

An improved method for estimating the remaining availability of a system is to use a Failure Analysis Engine to calculate the system's MTTF from the current time based on the known failure probability distribution of the system. This can be accomplished by sampling the failure probability distribution and summing the probabilities of failure at each of a series of small time intervals. If the MTTF falls below a critical threshold, actions can be taken via a Failure Prevention Engine to mitigate the potential failure based on the expected cause of the failure.

The availability of redundant systems can be calculated in the same way. Furthermore, their availabilities can be significantly increased by staggering the starting times of the individual systems in the redundant architecture to minimize the correlation between the failure probability distributions of the individual systems.

1.17 Hardware/Software Implementation Details

The present invention may be implemented with any combination of hardware and software. If implemented as a computer-implemented apparatus, the present invention is implemented using means for performing all of the steps and functions described above.

When implemented in software, the software code can be executed on any suitable processor or collection of processors, whether provided in a single computer or distributed among multiple computers.

The present invention can also be included in an article of manufacture (e.g., one or more computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s)/processor(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The computer(s)/processor(s) may have one or more input and output devices. These devices can be used, among other things, to present a user interface. Examples of output devices that can be used to provide a user interface include printers or display screens for visual presentation of output and speakers or other sound generating devices for audible presentation of output.

Examples of input devices that can be used for a user interface include keyboards, and pointing devices, such as mice, touch pads, and digitizing tablets. As another example, a computer may receive input information through speech recognition or in other audible format.

Such computers/processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in non-transitory computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A redundant system for mitigating correlated failure modes to increase availability of an application, the redundant system comprising:
   (a) a plurality of nodes connected by a computer network in an active-active configuration, wherein the redundant system remains available even if a node fails, each node simultaneously executing an instance of the application, each of the nodes allowing end users to use the instance of the application at the respective node;
   (b) a failure analysis engine configured to:
      (i) maintain current availability statistics for the nodes of the redundant system,
      (ii) calculate current mean time to failure (MTTF) from correlated failure modes for the redundant system, which includes the plurality of nodes, as a function of current time from the current availability statistics, wherein the current MTTF is a summation over time of a probability density function that the redundant system will fail at a time in the future multiplied by that time in the future and by a time interval, and
      (iii) compare the current MTTF for the redundant system, which includes the plurality of nodes, to a plurality of threshold values, each of the plurality of threshold values corresponding to one or more actions to be taken to increase application availability; and
   (c) a failure prevention engine configured to perform the one or more actions to increase application availability, wherein the one or more actions are selected from the group consisting of:
      (i) replacing a hardware component of the redundant system,
      (ii) restarting one of the plurality of nodes,
      (iii) restarting the instance of the application on one or more of the plurality of nodes,
      (iv) adding another node to the plurality of nodes,
      (v) rerouting end users away from one of the plurality of nodes,
      and combinations thereof.

2. The redundant system of claim 1 wherein the failure analysis engine is further configured to:
   (iv) determine the maintained current availability statistics for the nodes of the redundant system.

3. The redundant system of claim 1 wherein one of the actions is to replace a hardware component of the redundant system.

4. The redundant system of claim 1 wherein one of the actions is to restart one of the plurality of nodes.

5. The redundant system of claim 1 wherein one of the actions is to restart the instance of the application on one or more of the plurality of nodes.

6. The redundant system of claim 1 wherein one of the actions is to issue an alert warning message to prompt an operator to take corrective action to increase MTTF.

7. The redundant system of claim 1 wherein the current availability statistics include one or more of nodal failure probability distribution and mean time to repair (MTR).

8. A method of mitigating correlated failure modes in a redundant system to increase availability of an application, the redundant system including a plurality of nodes connected by a computer network, each node configured to run an instance of the application, the method comprising:
   (a) simultaneously executing an instance of the application at each of the nodes which are operating in an active-active manner, wherein the redundant system remains available even if a node fails, each of the nodes allowing end users to use the instance of the application at the respective node;
   (b) using a failure analysis engine to:
      (i) maintain current availability statistics for the nodes of the redundant system,
      (ii) calculate current mean time to failure (MTTF) from correlated failure modes for the redundant system, which includes the plurality of nodes, as a function of current time from the current availability statistics, wherein the current MTTF is a summation over time of a probability density function that the redundant system will fail at a time in the future multiplied by that time in the future and by a time interval, and
      (iii) compare the current MTTF for the redundant system, which includes the plurality of nodes, to a plurality of threshold values, each of the plurality of threshold values corresponding to one or more actions to be taken to increase application availability; and
   (c) performing the one or more actions, using a failure prevention engine, to increase application availability, wherein the one or more actions are selected from the group consisting of:
      (i) replacing a hardware component of the redundant system,
      (ii) restarting one of the plurality of nodes,
      (iii) restarting the instance of the application on one or more of the plurality of nodes,
      (iv) adding another node to the plurality of nodes,
      (v) rerouting end users away from one of the plurality of nodes,
      and combinations thereof.

9. The method of claim 8 wherein step (a) further comprises:
   (iv) determining the maintained current availability statistics for the nodes of the redundant system.

10. The method of claim 8 wherein steps (a) and (b) are periodically performed during operation of the redundant system.

11. The method of claim 8 wherein one of the actions is to replace a hardware component of the redundant system.

12. The method of claim 8 wherein one of the actions is to restart one of the plurality of nodes.

13. The method of claim 8 wherein one of the actions is to restart the instance of the application on one or more of the plurality of nodes.

14. The method of claim 8 wherein one of the actions is to issue an alert warning message to prompt an operator to take corrective action to increase MTTF.

15. The method of claim 8 wherein the current availability statistics include one or more of nodal failure probability distribution and mean time to repair (MTR).

16. A redundant system for mitigating correlated failure modes to increase availability of an application, the redundant system comprising:
   (a) a plurality of nodes connected by a computer network in an active-active configuration, wherein the redundant system remains available even if a node fails, each node simultaneously executing an instance of the application; and
   (b) a failure analysis engine configured to:
      (i) maintain availability statistics for the nodes of the redundant system,
      (ii) use correlated failure modes to calculate overall mean time to failure (MTTF) from the availability statistics for the redundant system, which includes the plurality of nodes, as a function of differential start time, wherein the overall MTTF is a summation over time of a probability density function that the redundant system will fail at a time in the future multiplied by that time in the future and by a time interval,
      (iii) determine an optimal stagger time of the nodes from the calculation of the overall MTTF, wherein the optimal stagger time is the differential start time that provides the largest MTTF for the redundant system, which includes the plurality of nodes, and
      (iv) start each of the nodes according to the optimal stagger time.

17. The redundant system of claim 16 wherein the failure analysis engine is further configured to:
   (iv) determine the maintained availability statistics for the nodes of the redundant system.

18. The redundant system of claim 16 wherein the availability statistics include one or more of nodal failure probability distribution and mean time to repair (MTR).

19. A method of mitigating correlated failure modes in a redundant system to increase availability of an application, the redundant system including a plurality of nodes connected by a computer network, each node configured to run an instance of the application, the method comprising using a failure analysis engine to:
   (a) simultaneously execute an instance of the application at each of the nodes which are operating in an active-active manner, wherein the redundant system remains available even if a node fails;
   (b) maintain availability statistics for the nodes of the redundant system;
   (c) use correlated failure modes to calculate overall mean time to failure (MTTF) from the availability statistics for the redundant system, which includes the plurality of nodes, as a function of differential start time, wherein the overall MTTF is a summation over time of a probability density function that the redundant system will fail at a time in the future multiplied by that time in the future and by a time interval;
   (d) determine an optimal stagger time of the nodes from the calculation in step (c), wherein the optimal stagger time is the differential start time that provides the largest MTTF for the redundant system, which includes the plurality of nodes; and
   (e) start each of the nodes according to the optimal stagger time.

20. The method of claim 19 further comprising using the failure analysis engine to:
   (f) determine the maintained availability statistics for the nodes of the redundant system.

21. The method of claim 19 wherein the availability statistics include one or more of nodal failure probability distribution and mean time to repair (MTR).

22. The redundant system of claim 1 wherein one of the actions is adding another node to the plurality of nodes.

23. The method of claim 8 wherein one of the actions is adding another node to the plurality of nodes.

24. The redundant system of claim 1 wherein each of the nodes allows end users to use an instance of the application at the respective node, and wherein one of the actions is rerouting end users away from one of the plurality of nodes.

25. The method of claim 8 wherein each of the nodes allows end users to use an instance of the application at the respective node, and wherein one of the actions is rerouting end users away from one of the plurality of nodes.

26. The redundant system of claim 1, wherein the summation over time becomes an interval of a continuous function when the time interval approaches zero.

27. The method of claim 8, wherein the summation over time becomes an interval of a continuous function when the time interval approaches zero.

28. The redundant system of claim 16, wherein the summation over time becomes an interval of a continuous function when the time interval approaches zero.

29. The method of claim 19, wherein the summation over time becomes an interval of a continuous function when the time interval approaches zero.

* * * * *

UNITED STATES PATENT AND TRADEMARK OFFICE
CERTIFICATE OF CORRECTION

PATENT NO. : 9,985,823 B1
APPLICATION NO. : 15/185652
DATED : May 29, 2018
INVENTOR(S) : Bruce D. Holenstein et al.

Page 1 of 1

It is certified that error appears in the above-identified patent and that said Letters Patent is hereby corrected as shown below:

In the Claims

At Column 20, Claim number 26, Line number 41, delete "interval" and insert --integral--.

At Column 20, Claim number 27, Line number 43, delete "interval" and insert --integral--.

At Column 20, Claim number 28, Line number 46, delete "interval" and insert --integral--.

At Column 20, Claim number 29, Line number 49, delete "interval" and insert --integral--.

Signed and Sealed this
Twenty-eighth Day of August, 2018

Andrei Iancu
*Director of the United States Patent and Trademark Office*